Sept. 6, 1960 R. J. SLAVSKY 2,951,301
IDENTIFICATION AND CLAIM TAG SYSTEM
Filed March 23, 1959 3 Sheets-Sheet 1
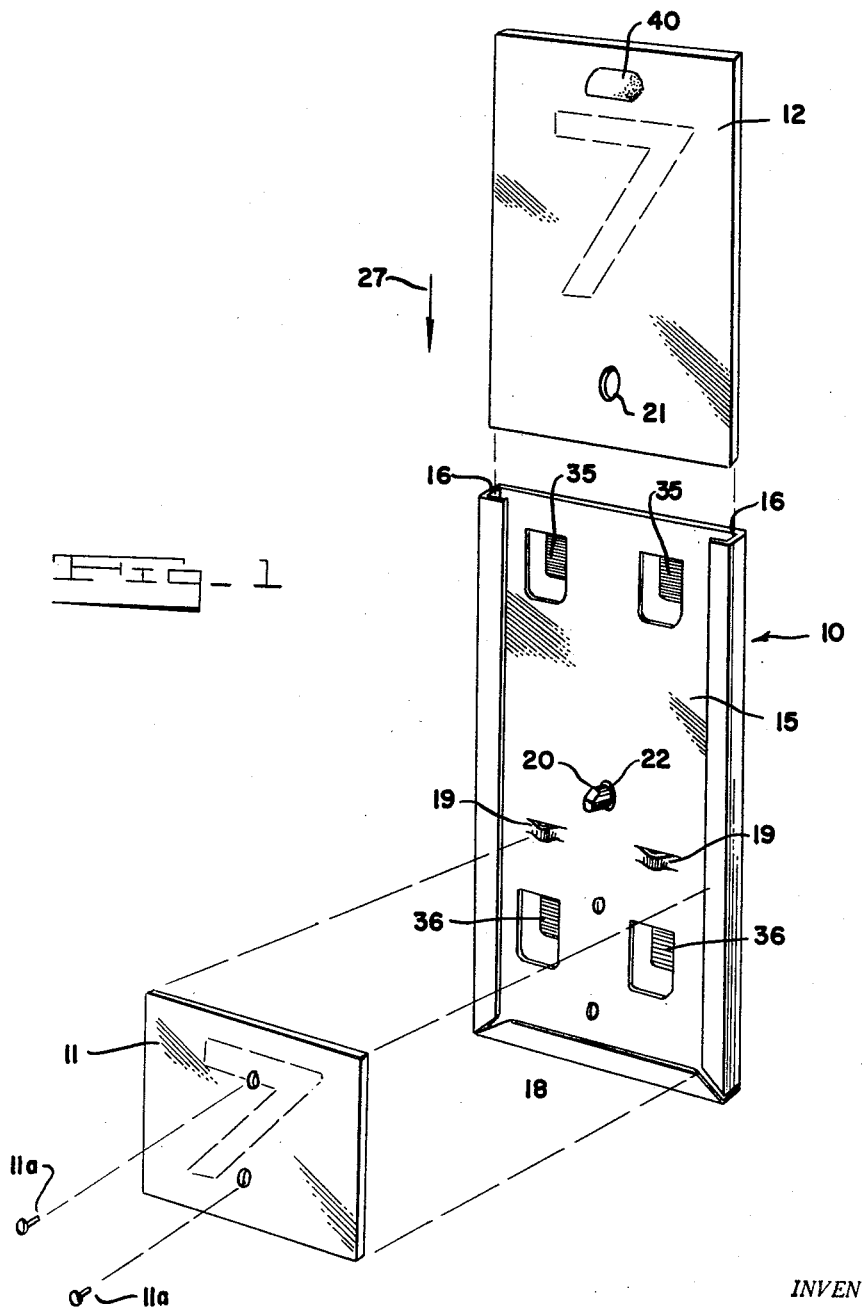
INVENTOR.
ROBERT J. SLAVSKY
BY
Cullen & Canton
ATTORNEYS Sept. 6, 1960 R. J. SLAVSKY 2,951,301
IDENTIFICATION AND CLAIM TAG SYSTEM
Filed March 23, 1959 3 Sheets-Sheet 2
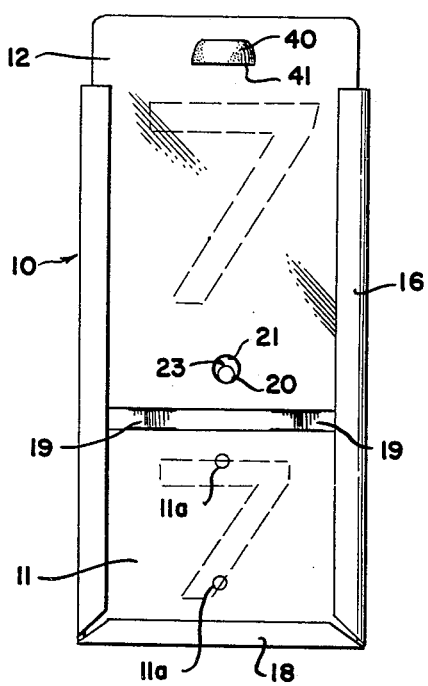
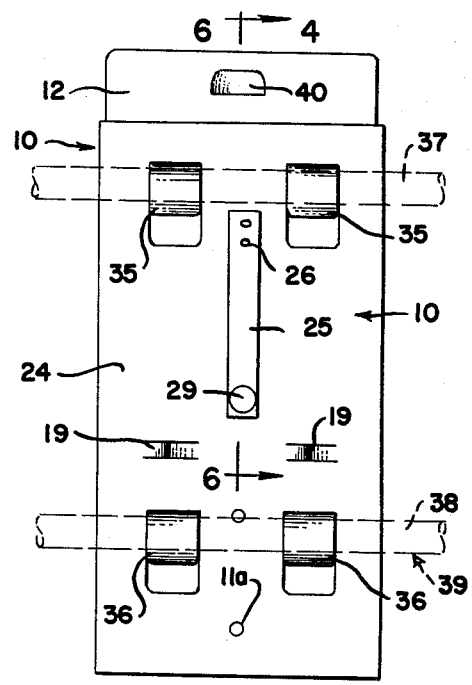
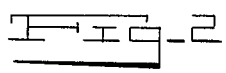
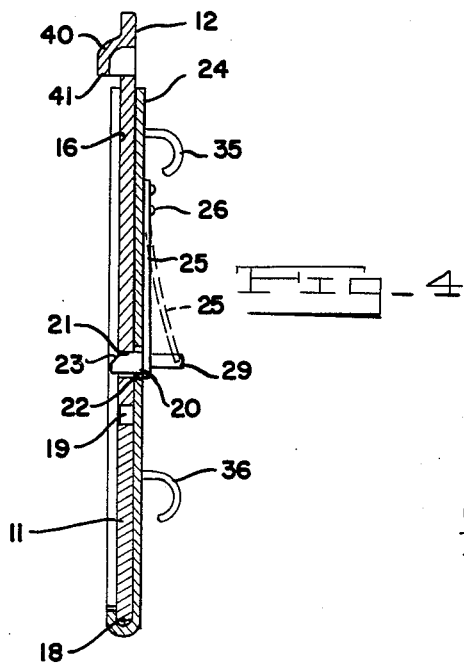
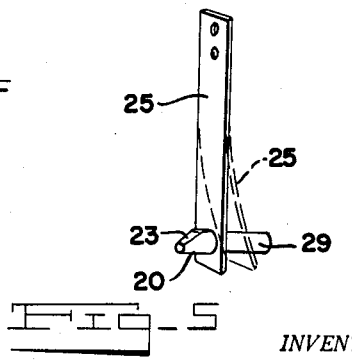
INVENTOR.
ROBERT J. SLAVSKY
BY Cullen & Cantor
ATTORNEYS

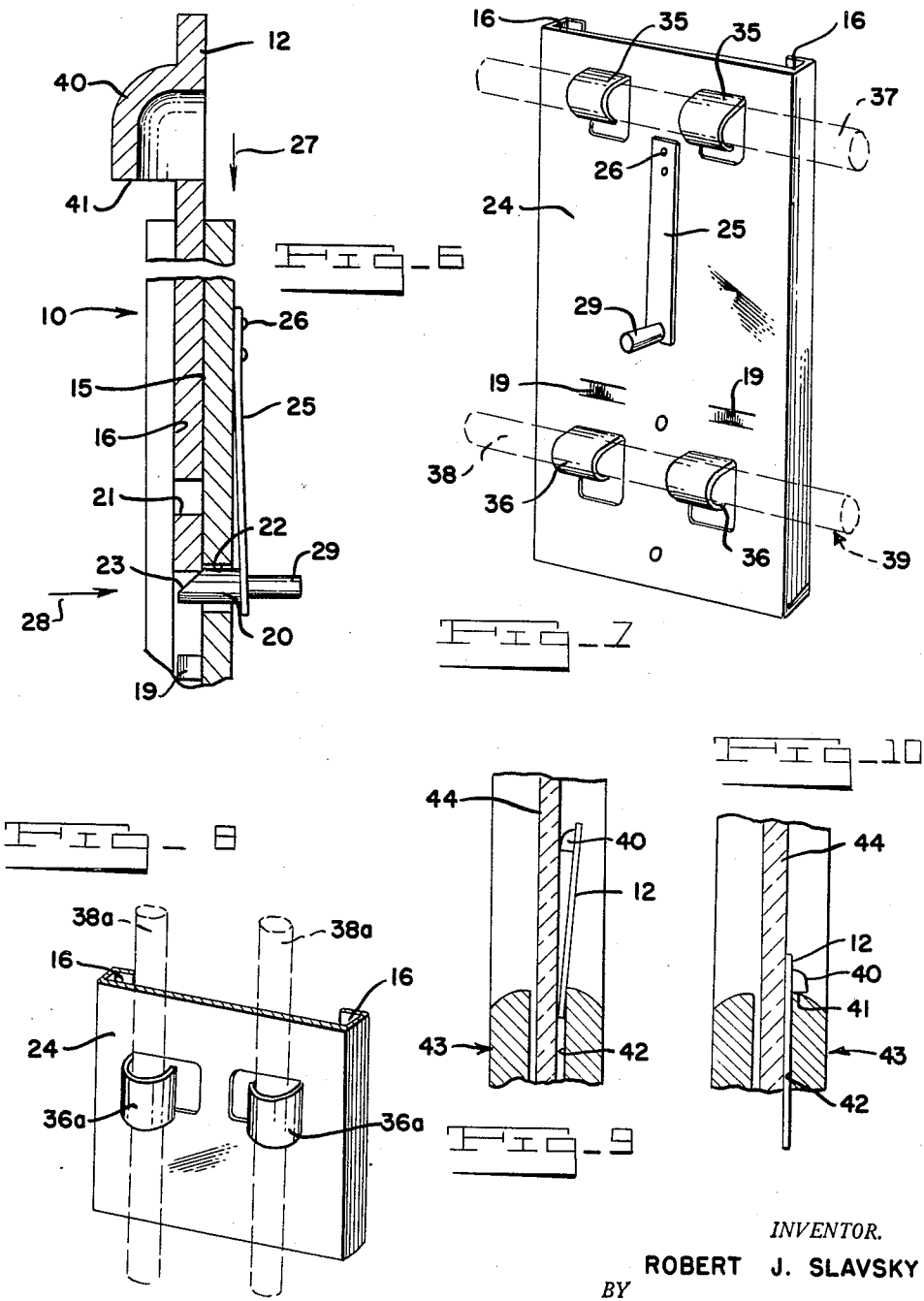

United States Patent Office 2,951,301
Patented Sept. 6, 1960

2,951,301

IDENTIFICATION AND CLAIM TAG SYSTEM

Robert J. Slavsky, Detroit, Mich., assignor to Shaw & Slavsky, Inc., Detroit, Mich.

Filed Mar. 23, 1959, Ser. No. 801,177

5 Claims. (Cl. 40—17)

This invention relates to an identification and claim tag system and more particularly to a parcel pick-up system useful for identifying shopping baskets and shopping carts and the like with a numbered identification card and claim tag. This application is a continuation-in-part of my prior applications, Ser. No. 665,411 filed June 13, 1957, and Ser. No. 697,273 filed November 18, 1957, both of which have since become abandoned.

In modern supermarket shopping, it is common for the housewife to load her own shopping basket or cart with groceries and to bring the basket or cart to the check-out counter to pay her bill. After she pays her bill she leaves the basket with an attendant and then drives her automobile to a loading platform where the attendant wheels her shopping cart loaded with the groceries to her automobile and then loads her groceries into her car. This type of arrangement requires a means for the woman shopper to identify her own basket or cart. The method usually used consisted of simple claim tags, such as are used in check rooms and the like, but this method is unsatisfactory and inefficient because the tags are usually lost or destroyed or damaged by the shoppers, and particularly by children, within a very short period of time.

Thus, it is an object of this invention to provide an identification and claim tag system whereby the tags for marking the basket or cart and for claiming the same are virtually indestructible and are so secured to the cart as to avoid their being destroyed, damaged, or lost in usual operation. Another object of this invention is to provide a mounting means for holding both an identification card and a claim tag upon a shopping basket or cart in such a way that the claim tag may be removed and replaced easily but is normally locked on the basket until needed and wherein the mounting means reinforces the basket.

A further object of this invention is to form a holder which is made of a single piece of sheet material and is so inexpensively constructed, that it may be used in large numbers to identify each shopping cart in a supermarket, but which nevertheless is formed to carry and lock the claim tag and identification card.

Also, in this system, the women commonly slip the claim tag into the window channel of the automobile against the side window so that the attendant can see the number on the claim tag against the window of the automobile and then bring that particularly order to the automobile.

One of the problems which have arisen with this system, is that the claim tags quite frequently slip down into the window channel of the automobile door and into the door itself so that it may not be recovered without taking the door apart. Consequently, many claim tags are lost this way. Thus, it is an object of this invention to so form the claim tag that it cannot slip down between the window and the door channel of an automobile.

This object is achieved by forming a struck out protuberance in the claim tag near the top thereof, with the protuberance functioning as a handle for grasping the tag and also either as a stop to prevent the tag from slipping all the way down into the automobile window channel or in the alternative as a wedge to cooperate with the bottom edge of the claim tag to wedge the tag into the window channel with the top edge spaced away from the window so that the tag is out of parallelism with the window, thus cannot slip down into the door.

These and other objects of this invention will become apparent upon reading the following description of which the attached drawings form a part.

In these drawings:

Fig. 1 is a disassembled perspective view of the identification card, claim tag and holder.

Fig. 2 is a front view of the holder carrying the card and tag, and

Fig. 3 is a rear view of Fig. 2.

Fig. 4 is a cross-sectional view taken in the direction of arrows 4—4 of Fig. 3.

Fig. 5 is an enlarged perspective view of a form of latching means useful for latching the claim tag in the holder.

Fig. 6 is a cross-sectional fragmentary view, drawn to an enlarged scale, taken in the direction of arrows 6—6 and shows the claim tag operating the latching means.

Fig. 7 is a perspective rear view of the holder, per se, and

Fig. 8 is a fragmentary view of a modification of the tongues shown in Fig. 7.

Figs. 9 and 10 are cross-sectional views of a fragment of an automobile door and show the claim tag wedged into the window channel and slipped into the channel, respectively.

With reference to the drawings, and particularly Fig. 1, the system herein is generally formed of three major elements: A holder plate 10, an identification card 11, and a claim tag 12.

The holder plate is formed of a flat sheet of rigid material such as sheet metal or the like, and is arranged vertically. Its vertical side edges are bent around upon the front face 15 of the holder plate to form a pair of opposed channels 16 on said front face. Also, its bottom edge is bent upwards to form an upwardly opening channel 18.

The identification card 11, consists of a thin sheet of suitable sheet material, such as plastic or heavy cardboard or the like, marked with an identification number. This card 11 is arranged to fit against the front face 15 of the holder plate, with its side edges arranged in the channels 16 and its bottom edge in the channel 18. A pair of struck-out stop lugs 19 are formed in the plate and spaced a considerable distance above the bottom channel 18 to thereby act as a top limiting means for the card 11. The side edges of the card are easily slipped into the channels 16 by bending the card and then manually pushing its edges into these channels with the card arranged between the stop lugs and bottom channel. The card may likewise be removed the same way but it is quite difficult to do so once it is inserted as mentioned above.

At times it may be desirable to rivet or otherwise permanently secure the identification card 11 within the holder to prevent unauthorized removal. Thus, rivets 11a are shown in the drawings to illustrate this permanent attachment. The rivets pass through aligning openings formed in the card and holder plate.

The claim tag 12 is preferably formed of a flat sheet of a relatively rigid material such as a suitable plastic or metallic material which is of sufficient thickness to remain fairly stiff and not bendable. For example the tag may be in the order of one sixteenth of an inch thick and about three inches long and two inches wide. The faces of the tag and of the identification card are normally imprinted with indicia, the indicia being in the form of the same number printed on both the tag and card.

The claim tag is arranged to slip down into the channel 16 from the top of the holder plate. The tag is normally locked to the holder by means of a latching stud 20 extending through an opening 21 formed in the tag. The latching stud (see Fig. 6) extends through an opening 22 in the holder plate. The front end of the stud is beveled on its top at 23 ad extends between the opposed channel 16 while the rear end extends outwardly of the rear face 24 of the holder plate. The stud is carried by a leaf spring 25 which is riveted or otherwise secured at 26 to the rear face 24 of the holder plate.

In operation, as shown in Fig. 6, the claim tag 12 is inserted downwardly in the direction of the arrow 27 into the channels 16 until the bottom edge of the claim tag strikes the beveled part 23 of the stud 20 to thereby force the stud rearwardly. Once the opening 21 in the claim tag is aligned with the stud 20, the stud resiliently springs into the tag opening 21 and locks the tag against removal. The bottom edge of the claim tag also is arranged to rest upon the stop lugs 19. In order to remove the tag, a manual force must be applied in the direction of the arrow 28 (see Fig. 6). The latch may be provided with grasping knob 29 for moving the stud out of latching position.

In order to secure the holder plate to a shopping basket or cart, tongues which are struck-out of an integral with the plate are provided for securing the plate to the wire members forming the usual shopping basket. Thus, in Fig. 7, it can be seen that tongues 35 are struck out of the plate at the top thereof and tongues 36 are struck out at the bottom. These tongues are arranged to be bent around and clinched to the wire members 37 and 38 (shown in dotted lines) forming parts of a shopping basket 39. With reference to Fig. 8, it can be seen that the tongues may be modified, such as in the form shown in 36a for clinching around vertical wires 38a.

Thus, it can be seen that the holder is formed of a single sheet or plate and is provided with the integral tag holding channels, stop lugs, and mounting tongues. In operation, the identification tag remains with the holder plate at all times and the claim tag remains with the holder until it is manually unlatched and disengaged therefrom. Thus, these tags will not be lost in normal operation and particularly are formed so that children cannot disengage them. Also, the holder plate serves as a strengthening brace and bumper for the shopping cart.

A means is provided for grasping the claim tag and this means is in the form of a struck-out protuberance 40 which is centered close to the top of the tag and is considerably narrower than the width of the tag. The protuberance is integral with the tag at its top and sides, but its bottom edge 41 is severed in a straight line and is spaced in front of the tag front face. Also the protuberance is curved, in cross-section (see Fig. 6), for rigidity.

In operation, the claim tag is removed from the shopper's basket and the shopper normally slips the tag into the window channel 42 of her automobile door 43 with the lower edge of the tag slipped into the channel and the protuberance 40 pressed up against the glass window 44 (see Fig. 9). With this arrangement, the tag is non-parallel with the window and is wedged tightly into the window channel so that it may not slip into the channel and be lost inside the door. However, should the shopper reverse the tag by mistake, that is, with the protuberance 40 facing away from the window, then should the tag slip through the window channel, as is common where the channel is loose, then the bottom edge 41 of the tag will catch against the top of the window channel and stop the tag from slipping through (see Fig. 10). Thereafter, the tag may be pried upwards from the channel by slipping a coin or a fingernail beneath the edge 41 and lifting the tag upwards.

Also, since the holder is made of sheet metal or the like, the exposed part, its front face, contrast sharply with the identification card 11 when the claim tag is withdrawn. Thus, the attention of the market attendant is called to the fact that the tag is out and reminds him to recover the tag from the shopper at the time he loads her groceries into her automobile. When the tag is in place it covers the struck-out tongues and conceals them so that the holder has a pleasing appearance and more importantly prevents the shoppers and particularly their children from seeing and reaching the tongues and playing with them to thus loosen the holder or remove the holder from the shopping cart.

This invention may be further developed within the scope of the following attached claims. Accordingly, it is desired that the foregoing description be read as being merely illustrative of an operative embodiment of this invention and not in a limiting sense.

I now claim:

1. A combination comprising a thin, flat, rigid rectangular shaped plate normally arranged in an upright position and having a front face and a back face and upright side edges; the side edges being bent parallel to and spaced from the plate front face to form side channels which open towards each other and which are open at their upper ends; a flat, rectangular shaped, claim tag normally arranged with its side edges fitted into the opposite channels and being in face to face contact with the front face of the plate, and normally being removable from the channels by moving it upwards through the open upper ends of the channels; a stop formed at the bottom of the plate for supporting the bottom edge of the claim tag; means for releasably latching the claim tag to the plate, said means comprising an opening formed in the claim tag approximately mid-way between the side edges thereof and a stud extending forwardly of the front face of the plate through an opening formed in the plate, and arranged to fit into said claim tag opening, said stud being spring biased and being arranged to retract through the plate opening against its spring pressure from extending forwardly of the plate to instead extend toward the rear of the plate to thereby engage and disengage with said opening in the claim tag, and the stud being beveled on its top so that downward pressure exerted by the bottom edge of the claim tag, when the claim tag is inserted downwardly through the open upper ends of the channels, causes the stud to retract for passage of the tag, with the stud resiliently returning to normal to automatically engage with the opening when the opening is aligned therewith.

2. A construction as defined in claim 1 and wherein the means for spring biasing the stud consists of a leaf spring having an end secured to the back face of the plate and being normally in face to face contact with the back face of the plate and having its opposite end connected to the stud for normally biasing the stud in a direction forwardly of the front face of the plate.

3. A combination comprising a thin, flat, rigid rectangular shaped plate normally arranged in an upright position and having a front face and a back face and upright side edges; the side edges being bent parallel to and spaced from the plate front face to form side channels which open towards each other and which are open at their upper ends; a flat, rectangular shaped, claim tag normally arranged with its side edges fitted into the opposite channels and being in face to face contact with the front face of the plate, and normally being removable from the channels by moving it upwards through the open upper ends of the channels; a stop formed at the bottom of the plate for supporting the bottom edge of the claim tag; means for releasably latching the claim tag to the plate, said means comprising an opening formed in the claim tag approximately mid-way between the side edges thereof and a stud extending forwardly of the front face of the plate through an opening formed in the plate, and arranged to fit into said claim tag opening, said stud being spring biased and being arranged to retract through the plate opening against its spring pressure from extending forwardly of the plate to instead extend toward the rear of the plate to thereby engage and disengage with said opening in the claim tag, and the stud being so formed that downward pressure exerted by the bottom edge of the claim tag, when the claim tag is inserted downwardly through the open upper ends of the channels, causes the stud to retract for passage of the tag, with the stud resiliently returning to normal to automatically engage with the opening when the opening is aligned therewith.

4. A construction as defined in claim 3, and wherein the claim tag is provided with a handle means for lifting it out of the side channels, said handle means being in the form of a single protuberance struck out of the sheet to extend a considerable distance outwardly of the face of the sheet, the top and side edges of said protuberance being integral with the sheet and with its bottom edge being severed from the sheet and being straight and being spaced from the plane of the sheet, the protuberance being centrally located between the side edges of the tag and being adjacent the top of the tag and the width of it being only a small fraction of the width of the tag, the opposite flat faces of the tag being otherwise flat and unobstructed so that the single protuberance is the only portion of the tag lying outside of the plane of the tag.

5. A claim tag comprising a relatively thick, flat card formed of a relatively rigid plastic sheet material and having a face having indicia thereon, and being normally arranged in a vertical plane, a single protuberance struck out of the sheet to extend a considerable distance outwardly of said face, said protuberance being integral on its upper and side edges with the sheet and being severed on its lower edge from the sheet to form a free substantially flat edge extending out of the plane of the sheet, said protuberance being of lesser vertical dimension than horizontal dimension with the horizontal dimension being only a small fraction of the horizontal dimension of the card, and being curved in vertical section for rigidity, said protuberance being centrally located between the side edges of the sheet, with the protuberance being located closely adjacent to the upper edge of the sheet, the opposite flat faces of the sheet being otherwise flat and unobstructed so that the single protuberance is the only portion of the sheet lying outside the plane of the sheet.

References Cited in the file of this patent

UNITED STATES PATENTS

| | | |
|---|---|---|
| 403,113 | Keller | May 14, 1889 |
| 425,621 | McKeage | Apr. 15, 1890 |
| 1,254,407 | Keppel | Jan. 22, 1918 |
| 1,533,005 | Hopp | Apr. 7, 1925 |
| 2,046,121 | Hopp | June 30, 1936 |
| 2,592,386 | Breakey | Apr. 8, 1952 |
| 2,615,268 | Hamilton | Oct. 28, 1952 |